(12) United States Patent
Grip et al.

(10) Patent No.: US 10,988,231 B2
(45) Date of Patent: Apr. 27, 2021

(54) SPACE FRAME FUSELAGE WITH PRESSURE MEMBRANE

(71) Applicant: The Boeing Company, Chicago, IL (US)

(72) Inventors: Robert Erik Grip, Rancho Palos Verdes, CA (US); Kevin John Sequeira, La Palma, CA (US)

(73) Assignee: The Boeing Company, Chicago, IL (US)

(*) Notice: Subject to any disclaimer, the term of this patent is extended or adjusted under 35 U.S.C. 154(b) by 398 days.

(21) Appl. No.: 15/604,409

(22) Filed: May 24, 2017

(65) Prior Publication Data
US 2018/0022435 A1 Jan. 25, 2018

Related U.S. Application Data (60) Provisional application No. 62/365,266, filed on Jul. 21, 2016.

(51) Int. Cl.
*B64C 1/08* (2006.01)
*B64C 1/12* (2006.01)
*B64C 1/10* (2006.01)

(52) U.S. Cl.
CPC ............ *B64C 1/08* (2013.01); *B64C 1/10* (2013.01); *B64C 1/12* (2013.01)

(58) Field of Classification Search
CPC ........... B64C 1/08; B64C 1/12; B64C 1/1415; B64C 1/22; B64C 2001/009; B64C 1/14; B64C 1/15; B64C 1/00
See application file for complete search history.

(56) References Cited

U.S. PATENT DOCUMENTS

| | | | |
|---|---|---|---|
| 1,363,996 A | 12/1920 | Rapp et al. | |
| 1,502,227 A | 7/1924 | Karl | |
| 1,554,224 A | 9/1925 | Mcgrath | |
| 1,677,535 A | 7/1928 | Cleave | |
| 1,880,481 A | 10/1932 | Ragsdale | |
| 1,881,296 A | 10/1932 | Alexandre | |
| 2,446,441 A * | 8/1948 | Taylor | B64C 1/22 244/118.1 |
| 2,976,968 A | 3/1961 | Fentiman | |
| 3,774,864 A * | 11/1973 | Hurkamp | B64C 39/10 244/13 |
| 4,161,301 A | 7/1979 | Beardsley et al. | |
| 4,167,258 A * | 9/1979 | Robertson | B64C 1/1415 244/129.5 |
| 4,256,012 A | 3/1981 | Cowart et al. | |

(Continued)

FOREIGN PATENT DOCUMENTS

| | | | |
|---|---|---|---|
| EP | 2886444 A1 | 6/2015 | |
| GB | 404606 A * | 1/1934 | B64C 1/061 |
| GB | 2448997 A | 11/2008 | |

OTHER PUBLICATIONS

European Patent Office; Extended European Search Report for European Patent Application No. 17182669.6 dated Nov. 30, 2017.

(Continued)

*Primary Examiner* — Christopher D Hutchens
(74) *Attorney, Agent, or Firm* — Parsons Behle & Latimer (57) ABSTRACT

Disclosed are structures and features of a space frame aircraft. In particular, this disclosure relates to a space frame aircraft with a pressure membrane.

20 Claims, 4 Drawing Sheets

(56) References Cited

U.S. PATENT DOCUMENTS

| | | | |
|---|---|---|---|
| 5,899,412 A * | 5/1999 | Dilorio | B64C 1/10 244/119 |
| 6,047,588 A * | 4/2000 | Danilychev | B65D 88/14 206/524.8 |
| 7,261,257 B2 | 8/2007 | Helou, Jr. | |
| 7,621,482 B2 | 11/2009 | Sankrithi et al. | |
| 7,887,011 B1 * | 2/2011 | Baldwin | B64C 37/02 244/118.1 |
| 7,891,608 B2 | 2/2011 | Rowdon et al. | |
| 8,387,917 B1 | 3/2013 | Grip et al. | |
| 8,708,282 B2 | 4/2014 | Helou, Jr. | |
| 9,415,871 B1 | 8/2016 | Paul et al. | |
| 9,657,489 B2 | 5/2017 | Harper | |
| 2005/0230528 A1 | 10/2005 | Gay | |
| 2006/0108477 A1 | 5/2006 | Helou, Jr. | |
| 2007/0108347 A1 | 5/2007 | Sankrithi et al. | |
| 2008/0056839 A1 * | 3/2008 | Maresh | B60P 7/065 410/119 |
| 2008/0272236 A1 * | 11/2008 | Rawdon | B64C 1/08 244/118.1 |
| 2009/0184126 A1 * | 7/2009 | Glaser | B64C 1/00 220/562 |
| 2009/0236473 A1 | 9/2009 | Rawdon et al. | |
| 2010/0200697 A1 | 8/2010 | Sankrithi et al. | |
| 2010/0276538 A1 | 11/2010 | Helou, Jr. | |
| 2012/0267478 A1 | 10/2012 | Dazet | |
| 2016/0244167 A1 | 8/2016 | Paul et al. | |
| 2016/0362905 A1 | 12/2016 | Harper | |

OTHER PUBLICATIONS

European Patent Office; Extended European Search Report for European Patent Application No. 17182668.8, dated Nov. 30, 2017.
US Patent and Trademark Office; Office Action issued in U.S. Appl. No. 15/604,249 dated Dec. 19, 2017.

* cited by examiner

SPACE FRAME FUSELAGE WITH PRESSURE MEMBRANE

CROSS-REFERENCE TO RELATED APPLICATIONS

This application, under 35 U.S.C. § 119, claims the benefit of U.S. Provisional Patent Application Ser. No. 62/365,266 filed on Jul. 21, 2016, and entitled "Space Frame Aircraft Structures," the contents of which is hereby incorporated by reference herein.

FIELD OF THE DISCLOSURE

This disclosure relates generally to structures and features of a space frame aircraft. In particular, this disclosure relates to a space frame aircraft with a pressure membrane.

BACKGROUND

Figure 1:
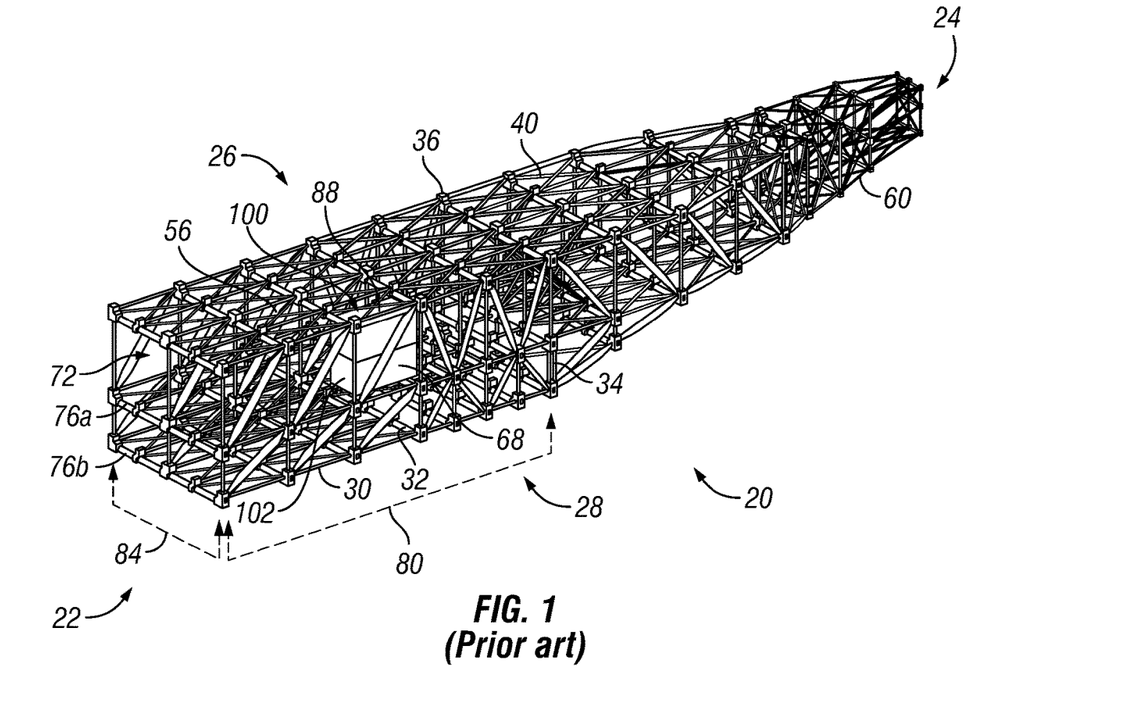
FIG. 1 is a perspective view of a space frame aircraft fuselage in accordance with embodiments of the disclosure.
Figure 2:
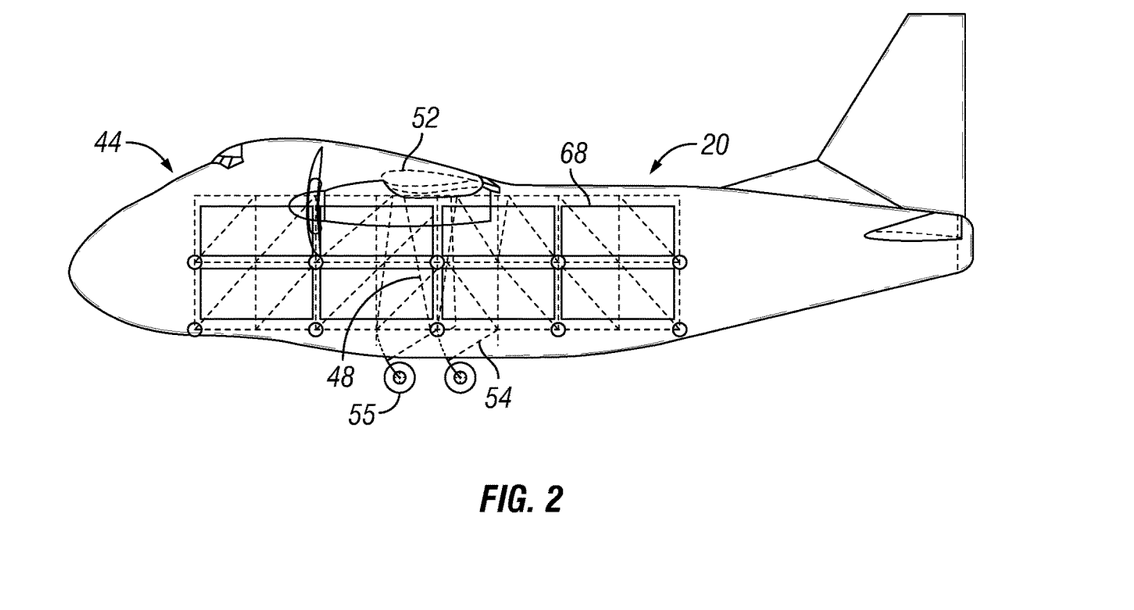
FIG. 2 is a schematic side view of a space frame aircraft in accordance with embodiments of the disclosure.

The statements in this section merely provide background information related to the present disclosure and may not constitute prior art. Space frame aircraft are known. For example, U.S. Pat. No. 7,891,608, titled "Space Frame Fuselage Structure And Related Methods," discloses embodiments of space frame aircraft and is hereby incorporated by reference in its entirety. In general, space frame aircraft may be used for, among other things, carrying cargo in one or more containers, such as an International Organization for Standardization ("ISO") shipping container. FIGS. 1-2 are schematic examples of portions of a space frame aircraft carrying a plurality of ISO containers.

In various configurations throughout this disclosure, a fuselage structure may accommodate inter-modal containers conforming to ISO specification 1496. ISO specification 1496 describes a family of inter-modal containers. Containers conforming to the foregoing specification have been commonly accepted throughout the world for surface vehicle use, e.g., to transport cargo on large ships, trucks and trains. A related specification, ISO specification 8323, describes an air-compatible, lightweight container. Throughout this disclosure all of the family of containers meeting either specification are collectively referred to as "ISO containers."

Typically, a space frame fuselage structure of the aircraft may include a plurality of nodes and a plurality of elements connecting the nodes to form a space frame in which to carry cargo. As disclosed in U.S. Pat. No. 7,891,608, a space frame may generally include longitudinal elements (e.g., longerons), lateral elements, vertical elements, or other elements that are joined together at nodes. Diagonal elements (also referred to herein as trusses, braces, or bracing) may also be included and connected between nodes.

One implementation of a fuselage space frame is indicated generally in FIG. 1 by reference number 20. The space frame 20 has a front, rear, and right and left sides indicated generally by reference numbers 22, 24, 26 and 28 respectively. The space frame 20 includes a plurality of longitudinal elements 30, lateral elements 32 and vertical elements 34 joined at a plurality of nodes 36. A plurality of diagonal elements 40 are connected between some of the nodes 36. Also included, though not shown on FIG. 1, may be a number of pins or mechanisms that support ISO containers 68. In some embodiments, the pins or support mechanisms for the ISO containers 68 may be slightly displaced relative to the space frame 20 structural nodes 36 to allow for a more simple integration of the support mechanisms in the space frame structure 20. This offset feature may result in some amount of bending moment being sustained by the longitudinal members 30. For the purposes of this disclosure, the locations of the support pins will be shown as being coincident with the structural nodes 36. In some places on the figures, some nodes 36 are depicted with a larger dot which represents the nodes 36 that are connected or close to the pins that carry the ISO containers 68, and are thus places where loads (mostly vertical) are introduced into the truss. Both the depiction of coincident location of pins and nodes, and differing size dots, are for simplicity and are inconsequential to the concepts of the current disclosure.

The space frame fuselage structure 20 is included in a space frame aircraft 44 parts of which are shown schematically in FIG. 2. External struts 48 (shown in phantom) may optionally be used to link wings 52 of the aircraft 44 with a portion 54 of the fuselage in the vicinity of landing gear 55. In this disclosure, the terms "wing" and "wings" may be used interchangeably. Other portions of the space frame 20 include a cargo hold 56 and an aft fuselage portion 60. Of course, other features of aircraft 44 are also possible.

The cargo hold 56 is configured to hold one or more ISO containers 68 in one or more generally rectangular bays 72 defined by one or more decks 76a, 76b, a plurality of longitudinal columns 80, and a plurality of transverse rows 84. For example, as shown in FIG. 1, a two-high stack or block 88 of 20-foot long ISO containers are in the left-most row 84 in the third 20-foot long column 80 of a deck 76a of the space frame 20. It should be noted that a space frame 20 may have rows 84 of different lengths. For example, as shown in FIG. 1, the space frame 20 has four rows 84: two outer rows and two center rows which are longer than the outer rows by the length of two bays 72. Other row 84 configurations are also possible. Likewise, columns 80 may be of differing widths and sizes.

It also should be noted that the term "deck" as used herein does not necessarily denote the presence of a "floor" on which one may walk. In the FIG. 1 embodiment, the decks 76a, 76b do not include floor surfaces (except, e.g., for such surface areas as may be provided by longitudinal and lateral elements 30 and 32.) Rather, "deck" refers to a level of the aircraft 44 that supports the cargo containers 68 from below. Thus, e.g., in the aircraft 44 of FIG. 1, the deck 76a is an upper deck on which the containers 68 are supported above a lower deck 76b. Likewise in FIG. 1, the space frame 20 is open at the front end 22 to permit full-width loading of the cargo hold 56 as further described below. Other configurations are possible. It should be noted that the open nature of the space frame allows it to typically be non-pressurized during flight.

The word "bay" has two meanings in this document. The first meaning is the open volume within the fuselage for carrying cargo—the "cargo bay." The second meaning refers to the approximately rectangular shape formed by coplanar, approximately orthogonal primary space frame elements.

In general, a space frame 20 fuselage is designed to carry ISO containers 68 in an efficient manner. This type of fuselage is typically rectangular in cross section. If the fuselage is unpressurized, this rectangular profile is not a disadvantage. However, if the interior of the space frame 20 fuselage is required to be pressurized, the rectangular profile presents a disadvantage because pressure vessels with flat sides are inefficient from a weight standpoint compared to circular pressure vessels.

In addition, some cargo must be pressurized. In order to accommodate a wide variety of cargo types it may be desirable to have at least a portion of the fuselage to be pressurized, or partially pressurized. Therefore, for some applications there may be a need to efficiently pressurize a space frame structure 20.

One solution to pressurizing a fuselage, is present in the commercial freighters in operation today, such as the 777F and the 747F made by The Boeing Company. These freighters have the advantage that, being derivatives of a passenger commercial aircraft, pressurization is included in the original design for the benefit of the passengers. However, these aircraft are typically heavier for a comparable payload compared to a freighter purpose-built to carry ISO containers 6. The higher operating empty weight (OEW) results in higher cargo rates compared to the freighter with a space frame 20 fuselage. In addition, being originally designed for passengers, these aircraft are not the ideal shape and size for carrying one or more ISO containers in a pressurized envelope, and it would require excessive work to reconfigure the size of the pressurized portion of the aircraft.

Another solution is to use ISO containers 68 that are designed to be individually pressurized. These ISO containers 68 are typically significantly heavier than the standard ISO containers 68, which would increase the cargo rate for those containers. In addition, some operators may greatly prefer a pressurized fuselage because it may simplify their operations. For example, they may also be risk-adverse, and not want to consider problems that may occur if some cargo which requires pressurization is inadvertently shipped on an aircraft that is unpressurized. Other drawbacks also exist.

SUMMARY

Accordingly, the disclosed systems and methods address the above noted drawbacks and issues with existing systems and methods. Disclosed embodiments include methods and apparatus for pressurizing some or all of the cargo hold bays.

Disclosed embodiments include a space frame fuselage including a cargo hold comprising a plurality of substantially rectangular bays configured to house one or more ISO containers, and a pressure membrane substantially enclosing the cargo hold.

In some embodiments, the plurality of substantially rectangular bays are arranged in one or more decks having external perimeter bays, and the pressure membrane further includes a curved surface covering the external perimeter bays. In some embodiments, the curved surface covering an external perimeter bay in one deck has a substantially eighteen inch offset spacing from the curved surface covering an external perimeter bay in an adjacent deck.

In some embodiments, the plurality of substantially rectangular bays connect at nodes, and the pressure membrane also connects to the spaceframe fuselage at the nodes. In some embodiments, an endcap membrane substantially covers a terminal end of the cargo hold.

In some embodiments, the pressure membrane includes a plurality of segments attached to the space frame. In some embodiments, tension wires span the cargo hold and counteracting a tension load caused by the pressure membrane.

Disclosed embodiments also include a space frame fuselage including a cargo hold comprising a plurality of substantially rectangular bays configured to house one or more ISO containers, and a pressure membrane substantially enclosing at least one of the plurality of substantially rectangular bays.

In some embodiments, the enclosed at least one of the plurality of substantially rectangular bays has a perimeter, and the pressure membrane further includes a curved surface extending around the perimeter of the enclosed at least one of the plurality of substantially rectangular bays. In some embodiments, the curved surface extending around the perimeter of one of the enclosed at least one of the plurality of substantially rectangular bays has an offset spacing of substantially eighteen inches from the curved surface extending around the perimeter of a vertically adjacent one of the enclosed at least one of the plurality of substantially rectangular bays.

In some embodiments, the enclosed at least one of the plurality of substantially rectangular bays connects at nodes, and the pressure membrane also connects to the spaceframe fuselage at the nodes. In some embodiments, an endcap membrane substantially covers a terminal end of the enclosed at least one of the plurality of substantially rectangular bays.

In some embodiments, the pressure membrane comprises a plurality of segments attached to the space frame. In some embodiments, tension wires span the cargo hold and counteracting a tension load caused by the pressure membrane.

Also disclosed is a method for selectively pressurizing at least a portion of an aircraft cargo hold including attaching a pressure membrane to at least one of a plurality of substantially rectangular bays configured to support one or more ISO containers therein, wherein the pressure membrane forms a substantially enclosed chamber when attached to the at least one of a plurality of substantially rectangular bays, and selectively changing an environmental condition within the substantially enclosed chamber. In some embodiments, the environmental condition comprises a pressure within the enclosed chamber and the method further includes pressurizing the enclosed chamber to a desired pressure.

In some embodiments, the plurality of substantially rectangular bays are arranged in one or more decks having internal bays and external perimeter bays; and the method further includes attaching the pressure membrane to the external perimeter bays to form an enclosed chamber that substantially encloses both the internal bays and the external perimeter bays. In some embodiments, the method further includes spacing the pressure membrane with substantially eighteen inches of offset between vertically adjacent external perimeter bays. In some embodiments, the method includes providing tension wires spanning the cargo hold to counteract a tension load caused by the pressure membrane. Other embodiments and modifications are also disclosed.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION

It should be noted that, although implementations are described with reference to ISO containers 68 and/or reference to containers having specific dimensions, the disclosure is not so limited. The disclosure may be implemented in relation to many different types and/or sizes of containers.

Figure 3:
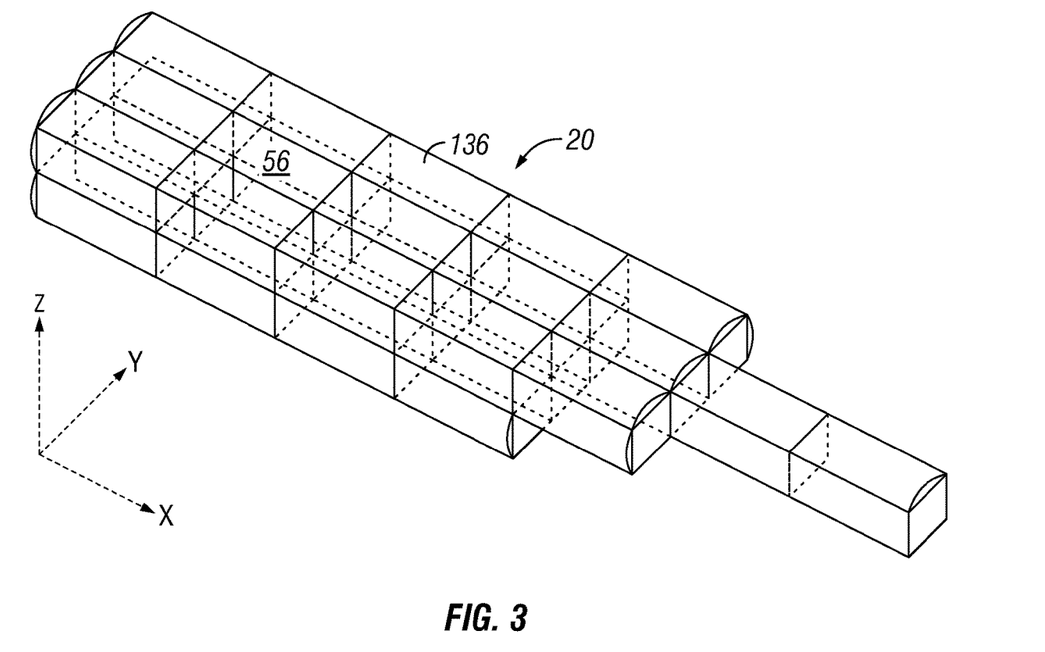
FIG. 3 is a schematic illustration of a space frame fuselage that has pressure membranes that enclose the entire cargo hold in accordance with disclosed embodiments.
Figure 5:
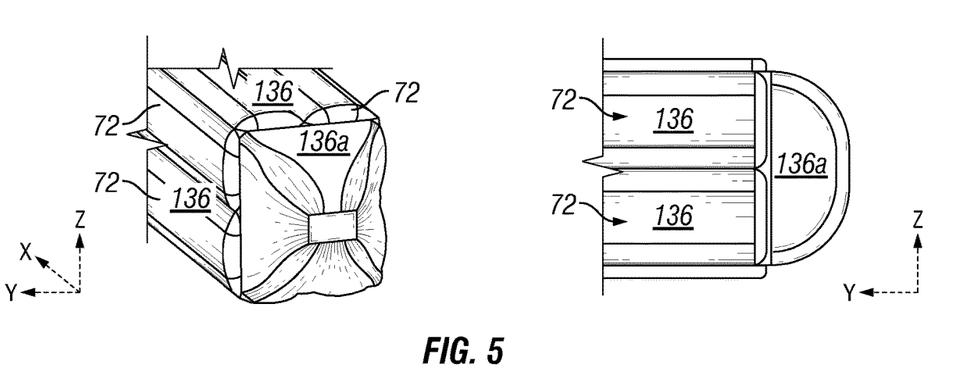
FIG. 5 is a schematic illustration showing enclosure of the top, bottom, and side bays in accordance with disclosed embodiments.
Figure 6:
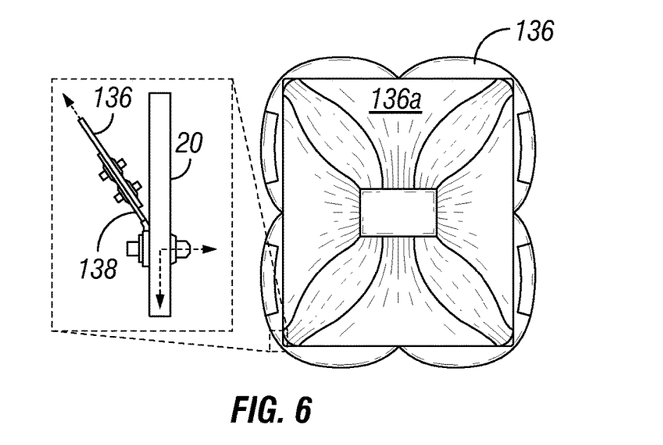
FIG. 6 is schematic, exploded-view, showing an embodiment for attaching the membrane edges to the space frame.

FIG. 3 is a schematic illustration of a space frame 20 fuselage that has pressure membranes 136 that enclose the entire cargo hold 56. The membranes 136 around the perimeter of the frontal cross section are straight in the longitudinal direction, and have circular curvature in the other direction (in the YZ plane). Pressure membranes 136 may be made of any suitable material. For example, pressure membranes 136 may be constructed as monocoque, semi-monocoque, sandwich panels, corrugated panels, or the like. The membranes 136 may be made from aluminum, carbon fiber reinforced polymers (CFRP), steel, polymers, Mylar, plastic impregnated cloth, rubber, vinyl, or the like. The membranes 136 may be formed as a continuous membrane over part, or all, of the fuselage cross section, or they may be segments fastened to the space frame 20. Because they are shielded from the sun's ultraviolet rays by the skin of the aircraft, the membranes 136 need not be resistant to ultraviolet radiation. Exemplary thickness for pressure membranes 136 are 0.044 inches for top and bottom portions, 0.063 inches for side portions, and 0.028 for end portions (e.g., end cap membrane 136a as shown in FIGS. 5-6). Other configurations and thicknesses are also possible.

Figure 4:
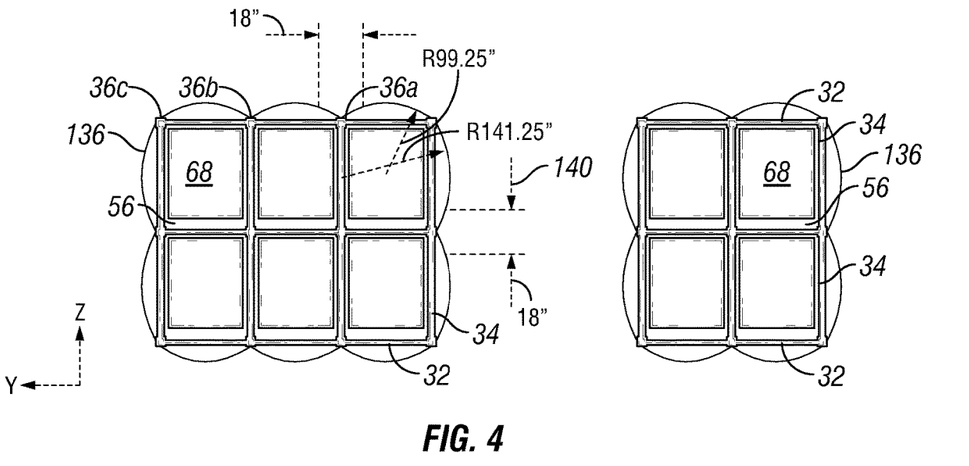
FIG. 4 is a schematic cross-section of a cargo hold and pressure membranes in accordance with disclosed embodiments.

Sample cross sections of the cargo hold 56 are depicted in FIG. 4 in which the pressure membranes 136 are also shown. The cross section on the left in FIG. 4 shows a 3×2 arrangement of ISO containers 68, and the cross section on the right of FIG. 4 shows a 2×2 arrangement of ISO containers 68. As shown on the 3×2 arrangement, an 18 inch offset between the space frame and the outer mold line ("OML") of the pressure membrane 136 may be used. In addition, the membrane 136 may be curved with a radius of curvature of 99.25 inches from the center of bay 72, and a radius of curvature of 141.25 inches from a center of inner vertical member 34 as indicated in FIG. 4.

FIG. 5 is a schematic illustration that shows how the top, bottom, and side bays 72 may be closed out. The ends of a sixteen twenty-foot-equivalent units ("TEU") freighter may utilize a single end-cap membrane 136a as shown in FIG. 5. This allows for simpler more cost effective repairs. Alternatively, each of the four bays 72 could have a separate pressure membrane 136. In some embodiments, these pressure membranes 136 may be covered by a light non-pressurized aero surface.

FIG. 6 is a schematic, exploded-view, showing an embodiment for attaching the membrane 136 edges to the space frame 20. Appropriate seals are used with a bracket 138, the space frame 20, and the membrane 136 to maintain pressure.

In some embodiments, the pressure membranes 136 are connected to the node locations 36 on the space frame 20. Since the required thickness of a circular pressure membrane 136 for a given pressure is proportional to the inverse of the radius of the circle, it is advantageous to approximately minimize the radius of curvature of the membrane 136. For a given distance between the space frame 20 and the most distant part of the pressure membrane 136 (the eighteen inches offset shown at 140 in FIG. 4), it is advantageous to minimize the span of the pressure membrane 136, and thus it is advantageous to have the membrane 136 connect at the interior nodes 36a, 36b, of the side of the fuselage compared to connecting the membranes 136 only at the corner nodes 36c.

The outward pressure applied to the membranes 136 results in compression forces being applied to the space frame 20 members. Thus, the membranes 136 on the side of the fuselage will apply a compression load to the vertical elements 34 of the space frame 20 on the side of the fuselage, and the top and bottom membranes 136 will apply compression to the lateral elements 32 on the top and bottom of the fuselage.

The pressure membranes 136 also apply loading to the space frame 20 substantially normal to the face on which they are situated. Thus, the side membranes 136 apply a tension force to the all the lateral elements 32, both the lateral elements 32 on the top and bottom of the fuselage, and also the center interior lateral elements 32. The top and bottom membranes 136 apply a tension force to all the vertical elements 34 of the space frame 20, including both the right and left side vertical elements 34, and also the interior vertical elements 34. These forces tend to counteract the compression forces applied to the space frame 20 described above.

Figure 7:
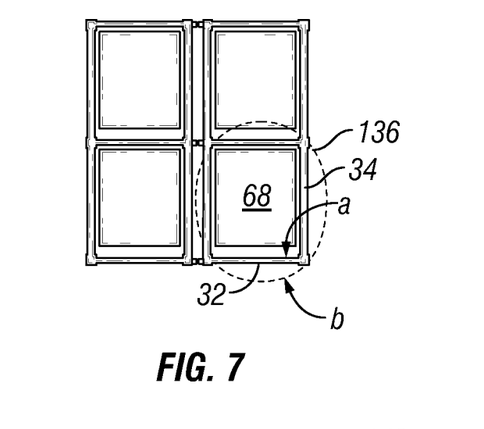
FIG. 7 is a schematic illustration of forces applied by the membranes in accordance with disclosed embodiments.

The forces applied by the membranes 136 are also partially counteracted not just by the outer space frame 20 members (indicated at A in FIG. 7), but also by the membranes in the substantially normal direction (indicated at B in FIG. 7). Thus, the normal load in the horizontal direction applied by the side membrane 136 upon the surrounding structure is counteracted partially by the horizontal component of the tension force in the top or bottom membrane 136. Similarly, the normal force upward on the top membrane 136 or downward on the lower membrane 136 is at least partially counteracted by the vertical component of the side membrane 136 attached to the same corner.

The optimum geometry for the pressure membranes 136 in some embodiments may involve varying the radius of curvature of the various membranes 136. Of course, the geometry is limited by the constraints of the location of the nodes 36 and the maximum distance the membrane 136 is allowed to be from the space frame 20.

The weight impact upon an operator of the pressurized space frame 20 fuselage for the pressurized membrane 136 is an increase on the order of six percent of the cargo rate.

Figure 8:
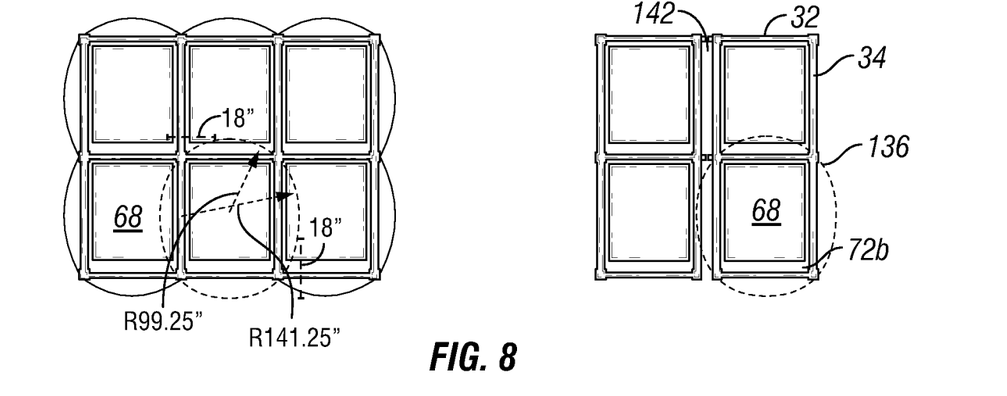
FIG. 8 is a schematic illustration showing cross sections of two space frame fuselage structures that have pressure membranes that enclose a single deck in accordance with disclosed embodiments.

FIG. 8 schematically shows cross sections of two space frame 20 fuselage structures that have pressure membranes 136 that enclose just a single "stick" of ISO containers 68 in lower bay 72b. They are shown by the thicker lines 136 in FIG. 8. The structural behavior of this FIG. 8 embodiment is similar to that described for the membranes 136 that enclose the entire cargo hold 56, with some differences.

One difference is that there are no internal members. Another difference is that there is an additional constraint upon the distance between the membrane 136 and the space frame 20 (i.e., the eighteen inches indicated at 140 in FIG. 4) because of the adjoining ISO containers 68. As shown on the right side of FIG. 8, the interior columns 142 have been designed so that there is ample space for the membrane 136.

The weight impact of this FIG. 8 configuration upon an operator of the pressurized space frame 20 fuselage for this concept is an increase approximately one percent of the cargo rate. This is less impact compared to the six percent increase incurred with the membranes 136 enclosing the whole cargo hold 56. For that reason, this configuration may be attractive to an operator that greatly desires to have a pressurized fuselage.

As the fuselage is pressurized, the membranes 136 will transfer tension load to the space frame 20. For the membranes 136 on the side of the fuselage, for example, the horizontal component of that load will tend to bend the longitudinal elements 30 so that they bow outward. This bending moment that the longitudinal element 30 experiences will result in additional weight to the space frame 20. One way to substantially eliminate these bending moments is to provide additional horizontal tension wires 144 (shown in FIG. 9) running cross-ship to the opposite side. The tension load then is transferred directly to the opposite side of the space frame 20 instead of being carried by bending moments along the longitudinal element 30 until it can be transferred by one of the lateral elements 32 of space frame 20. The tension wires 144 thus serve the same function as the lateral space frame elements 32 discussed above.

Figure 9:
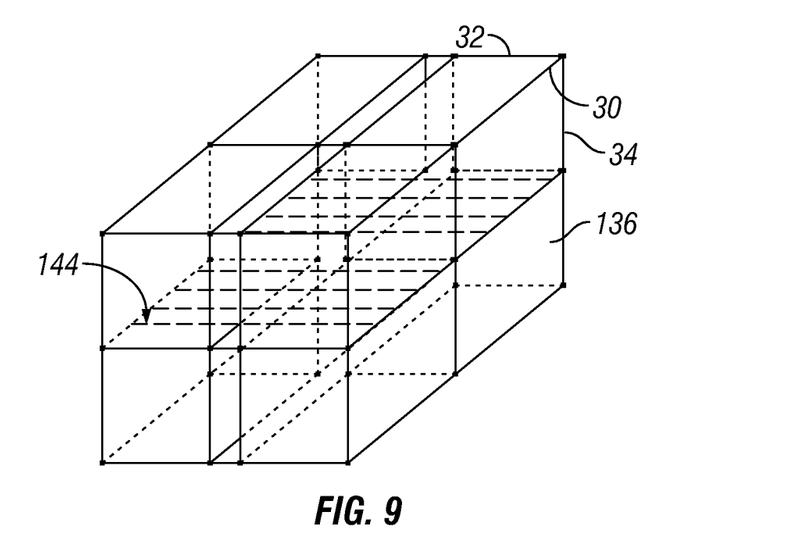
FIG. 9 is a schematic illustration of tension wires in accordance with disclosed embodiments.

Horizontal tension wires 144 can also be added on the upper and lower horizontal faces of the space frame 20, but they are not as effective because the membranes 136 on the top and bottom sides of the space frame 20 also carry tension loads, and thus help reduce the bending moments on the corner longitudinal elements 30. The same arrangement can be provided in the vertical direction, especially for the interior longitudinal elements 30 on the top and bottom faces of the space frame 20. These interior wires 144 thus substantially eliminate the bending moment in the longitudinal elements 30 that would make them bow outward.

Although various embodiments have been shown and described, the present disclosure is not so limited and will be understood to include all such modifications and variations are would be apparent to one skilled in the art.

What is claimed is:

1. A space frame fuselage comprising:
   a skin substantially covering an outer surface of the space frame fuselage;
   a cargo hold, located interior to the skin, and comprising a plurality of substantially cylindrical longitudinal elements, substantially rectangular lateral elements, and substantially cylindrical vertical elements, joined at a plurality of nodes and configured into a plurality of substantially rectangular bays configured to house one or more ISO containers; and
   a pressure membrane, located interior to the skin, containing an above-ambient pressure environment, and substantially enclosing the cargo hold.

2. The space frame fuselage of claim 1 wherein the plurality of substantially rectangular bays are arranged in one or more decks having external perimeter bays; and
   the pressure membrane further comprises:
   a curved surface covering the external perimeter bays.

3. The space frame fuselage of claim 1 wherein the plurality of substantially rectangular bays connect at the plurality of nodes and wherein the pressure membrane also connects to the spaceframe fuselage at one or more of the plurality of nodes.

4. The space frame fuselage of claim 1 further comprising:
   an endcap membrane that substantially covers a terminal end of the cargo hold.

5. The space frame fuselage of claim 1 wherein the pressure membrane comprises a plurality of segments attached to the space frame.

6. The space frame fuselage of claim 1 further comprising:
   tension wires spanning the cargo hold and counteracting a tension load caused by the pressure membrane.

7. The space frame fuselage of claim 2 wherein the curved surface covering an external perimeter bay in one deck has a substantially eighteen inch offset spacing from the curved surface covering an external perimeter bay in an adjacent deck.

8. The space frame fuselage of claim 1 wherein the pressure membrane is a monocoque, semi-monocoque, sandwich panel, or corrugated panel construction.

9. The space frame fuselage of claim 1 wherein the pressure membrane comprises aluminum, carbon fiber reinforced polymers (CFRP), steel, polymers, polyester resin, plastic impregnated cloth, rubber, or vinyl.

10. The space frame fuselage of claim 1 wherein the pressure membrane comprises a top portion and a bottom portion that are substantially 0.044 inches thick, side portions that are substantially 0.063 inches thick, and end portions that are substantially 0.028 inches thick.

11. A space frame fuselage comprising:
    a skin substantially covering an outer surface of the space frame fuselage;
    a cargo hold, located interior to the skin, and comprising a plurality of substantially cylindrical longitudinal elements, substantially rectangular lateral elements, and substantially cylindrical vertical elements, joined at a plurality of nodes and configured into a plurality of substantially rectangular bays configured to house one or more ISO containers; and
    a pressure membrane, located interior to the skin, containing an above-ambient pressure environment, and substantially enclosing at least one of the plurality of substantially rectangular bays.

12. The space frame fuselage of claim 11 wherein the enclosed at least one of the plurality of substantially rectangular bays has a perimeter; and
    the pressure membrane further comprises:
    a curved surface extending around the perimeter of the enclosed at least one of the plurality of substantially rectangular bays.

13. The space frame fuselage of claim 12 wherein the curved surface extending around the perimeter of one of the enclosed at least one of the plurality of substantially rectangular bays has an offset spacing of substantially eighteen inches from the curved surface extending around the perimeter of a vertically adjacent one of the enclosed at least one of the plurality of substantially rectangular bays.

14. The space frame fuselage of claim 11 wherein the enclosed at least one of the plurality of substantially rectangular bays connects at the plurality of nodes and wherein the pressure membrane also connects to the spaceframe fuselage at one or more of the plurality of nodes.

15. The space frame fuselage of claim 11 further comprising:
an endcap membrane that substantially covers a terminal end of the enclosed at least one of the plurality of substantially rectangular bays.

16. The space frame fuselage of claim 11 wherein the pressure membrane comprises a plurality of segments attached to the space frame.

17. The space frame fuselage of claim 11 further comprising:
tension wires spanning the cargo hold and counteracting a tension load caused by the pressure membrane.

18. The space frame fuselage of claim 11 wherein the pressure membrane is a monocoque, semi-monocoque, sandwich panel, or corrugated panel construction.

19. The space frame fuselage of claim 11 wherein the pressure membrane comprises aluminum, carbon fiber reinforced polymers (CFRP), steel, polymers, polyester resin, plastic impregnated cloth, rubber, or vinyl.

20. The space frame fuselage of claim 11 wherein the pressure membrane comprises a top portion and a bottom portion that are substantially 0.044 inches thick, side portions that are substantially 0.063 inches thick, and end portions that are substantially 0.028 inches thick.

* * * * *